United States Patent [19]

Uhlyarik

[11] 4,168,841
[45] Sep. 25, 1979

[54] CONVERSION SYSTEM FOR PEDAL OPERATED CYCLES WITH IMPROVED REAR WHEEL APPARATUS

[76] Inventor: Emanuel J. Uhlyarik, 23309 Westbury Dr., St. Clair Shores, Mich. 48080

[21] Appl. No.: 894,164

[22] Filed: Apr. 6, 1978

[51] Int. Cl.² ............... B62K 13/00; B62B 19/04
[52] U.S. Cl. ................ 280/7.12; 180/196; 280/11; 280/12 AB; 280/12.14
[58] Field of Search ............ 280/7.12, 7.14, 12 AB, 280/12.14, 8, 9, 11, 226 R, 226 A, 220; 180/6 A

[56] References Cited

U.S. PATENT DOCUMENTS

| | | | |
|---|---|---|---|
| 473,434 | 4/1892 | Stevens | 280/7.14 |
| 526,210 | 9/1894 | Young | 280/12.14 |
| 538,493 | 4/1895 | Balser | 280/12.14 |
| 561,405 | 6/1896 | Leahan | 280/7.14 |
| 573,034 | 12/1896 | Peterson | 280/7.12 |
| 1,268,229 | 6/1918 | Frank | 280/7.14 |
| 1,521,818 | 1/1925 | Katona | 280/12.14 |
| 3,441,285 | 4/1969 | Rogers | 280/7.12 |
| 3,630,301 | 12/1971 | Henricks | 280/7.4 |
| 3,884,484 | 5/1975 | Uhlyarik | 280/7.12 |

Primary Examiner—David M. Mitchell
Attorney, Agent, or Firm—Dolgorukov & Dolgorukov

[57] ABSTRACT

The specification discloses a conversion system for a pedal operated cycle to provide a pedal operated cycle for use on ice and/or a motor operated cycle for use on snow, both with improved rear wheel apparatus, wherein a regular bicycle can be converted to a vehicle having a forward ski mechanism and an integral rear wheel and rearward ski mechanism. The combination rear wheel and rearward ski mechanism comprises a pair of brackets mounted to the frame in place of the rear wheel, which, in turn, has been remounted within said bracket. To the brackets there are attached, by way of braces, a pair of winter use skis.

Frame supports are provided for the skis, and spring mounting pads, which cooperate with second spring mounting pads attached to a seat support enable the seat to reciprocate with the rear wheel, and thus direct maximum pressure on the rear wheel, it being understood that the pressure on the rear driving wheel is solely provided by the rider, the function of the springs being to provide stability to the cycle by keeping the skis in contact with the ground. An emergency brake mechanism is also provided.

13 Claims, 11 Drawing Figures

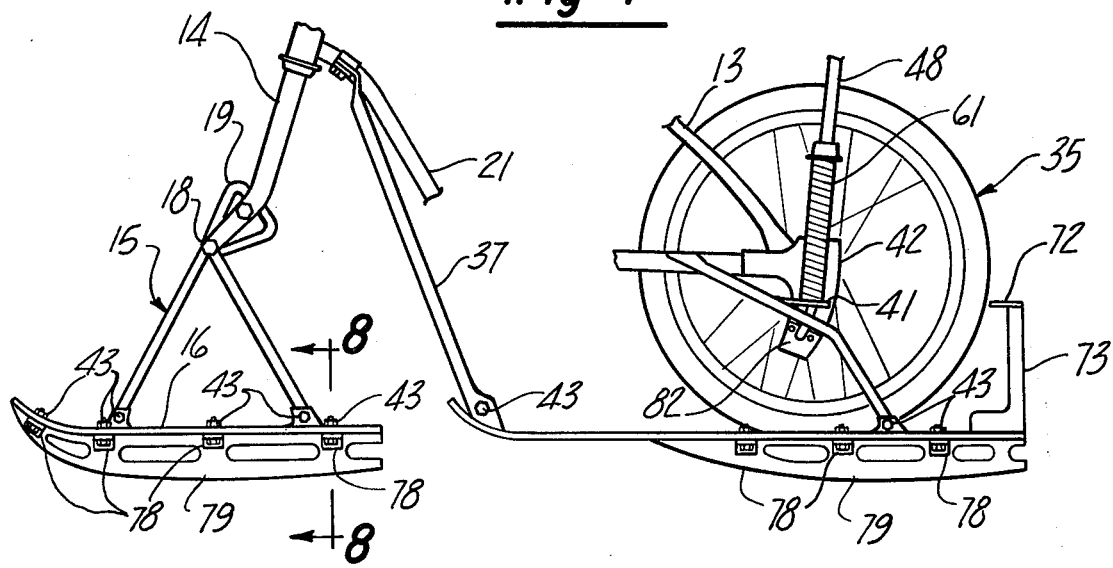
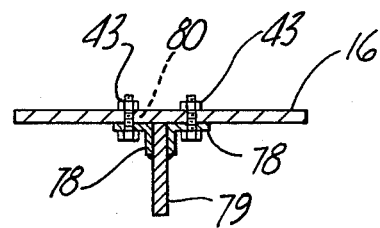
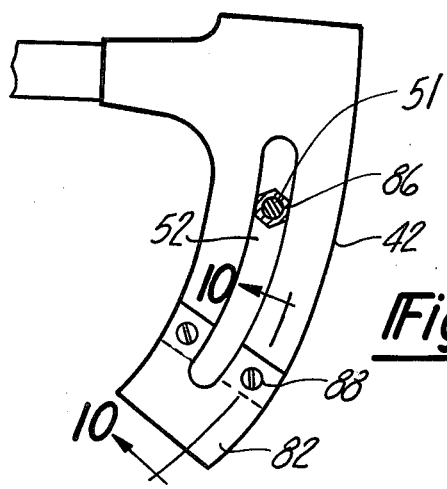
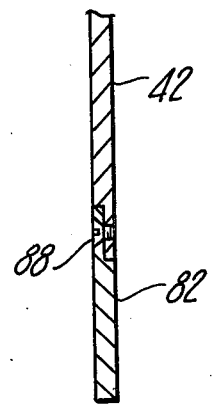

CONVERSION SYSTEM FOR PEDAL OPERATED CYCLES WITH IMPROVED REAR WHEEL APPARATUS

The present invention relates to conversion systems for pedal operated cycles generally of the type shown in my previous U.S. Pat. No. 3,884,484, and more particularly to such a conversion system with an improved rear wheel apparatus and other improvements.

Although the conversion system discussed in my earlier patent, which consisted essentially of a forward ski mechanism which replaced the front wheel of an ordinary bicycle, a rear wheel mechanism which replaced the rear wheel, and a rearward ski mechanism which was mounted to the frame of the bicycle, provided adequate traction when traveling over ice, after supervising its use for a period of time, it became evident that for some reason it did not provide adequate traction in snow when the surface it was traveling over was more than slightly irregular.

Investigation to determine the possible cause of this problem led to some interesting discoveries. It was found, for example, that although the forward ski mechanism had adequate travel to traverse some irregular surfaces, the rear wheel of the bike did not have sufficient travel in the arcuate slot to maintain traction over all such surfaces. This was due mainly to restricted rear wheel travel provided by the arcuate motion and the fact that the entire rear end of the cycle, including the skis, became involved in such motion. The only pressure being supplied to the wheel mechanism coming from the spring tension provided. It was thus obvious that additional travel and downward force had to be put on the rear wheel to have a conversion system which would travel over more than slightly irregular surfaces.

While my previous invention proved suitable for use by children on ice, since it was intended for adults, an improved apparatus had to be provided.

I felt that if the rearward ski mechanism and the rear wheel drive mechanism could be made as an essentially unitary construction, my conversion system for pedal and motor operated cycles would appeal to a wider segment of the public.

Thus, one of the objects of the present invention is to provide an improved conversion system for the cycles having a combination rear drive wheel and rearward ski assembly.

Another object of the present invention is to provide an improved conversion system for pedal and motor operated cycles, whereby the difficulties and disadvantages of the prior constructions are overcome and largely eliminated, and a more durable and less expensive construction is provided.

A further object of the present invention is to provide, as a part of a conversion system for pedal operated cycles, an emergency brake means to help the cycle so converted out of difficult situations.

A further object of the present invention is to provide a conversion system for pedal operated cycles wherein an improved rear wheel drive apparatus makes it possible for such cycle to travel over icy and more difficult terrain than was heretofore possible.

A further object of the present invention is to provide a conversion system for pedal operated cycles wherein the entire downward force on the rear wheel is the result of the weight of the rider directed to the drive wheel, and only the weight of the rear end of the cycle, including the skis, compressing the springs acts in opposition thereto, thereby reducing the necessary force to put the cycle in forward motion.

A still further object of the present invention is to provide an improved rear wheel apparatus for conversion systems for pedal and motor operated cycles, wherein the weight of the rider of the bicycle which has been converted is directed directly downward substantially on an axis passing through the axis of rotation of the rear wheel of said assembly.

A still further object of the present invention is to provide pedal operated cycles such that the ski assemblies used in such conversion systems will have removable runners to adapt them for use on ice.

Another object of the present invention is to provide a conversion system for pedal operated cycles for ice use and motor operated cycles for snow use which is relatively simple in nature and inexpensive to manufacture.

Further objects and advantages of this invention will be apparent from the following description and appended claims reference being had to the accompanying drawings forming a part of the specification, wherein like reference characters designate corresponding parts in the several views.

FIG. 7 is a partial elevational view similar in part to FIG. 2 but showing an additional type of ski which may be mounted on the ski assemblies of a construction embodying my invention.

FIG. 8 is a sectional view taken in the direction of the arrows along the section line 8—8 of FIG. 7.

FIG. 9 is a sectional view taken in the direction of the arrows on the section line 9—9 of FIG. 6.

FIG. 10 is a sectional view taken in the direction of the arrows on the section line 10—10 of FIG. 9, and showing the removable bottom portion of the bracket.

It is to be understood that the invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of description and not of limitation.

Figures 1, 2:
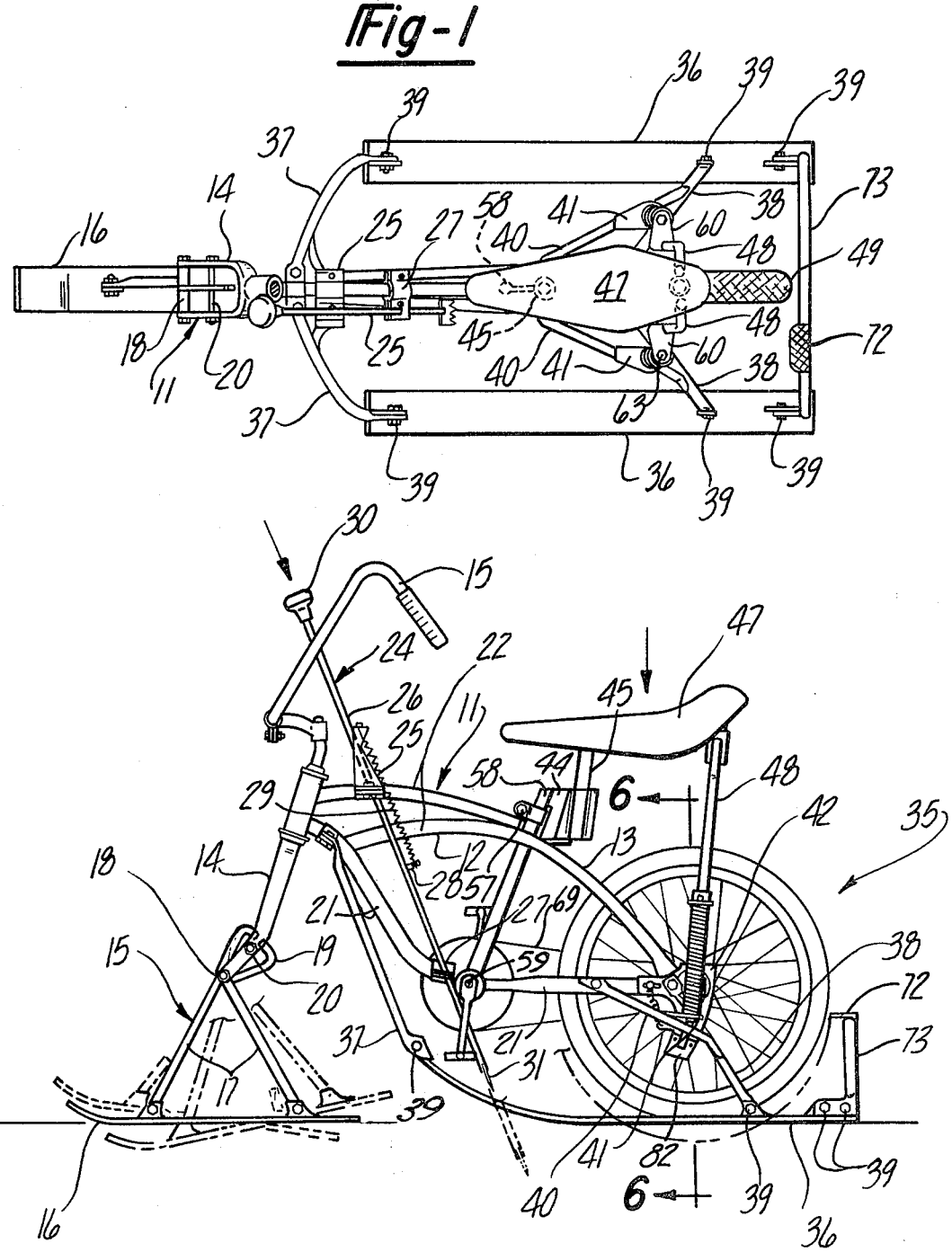
FIG. 1 is a plan view of a conversion system for pedal operated cycles embodying my improved apparatus.
FIG. 2 is a side elevational view of the bicycle shown in FIG. 1 with the apparatus embodying my invention mounted thereon.
Figure 3:
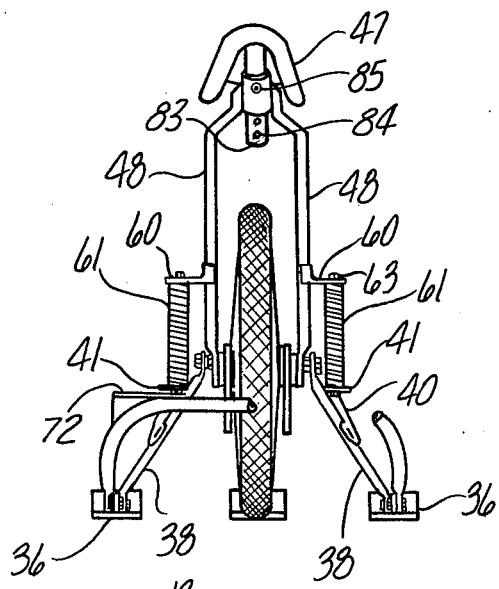
FIG. 3 is a rear elevational view, partially broken away, of a construction embodying the present invention and showing means for adjusting the height of the rider's seat.
Figure 4:
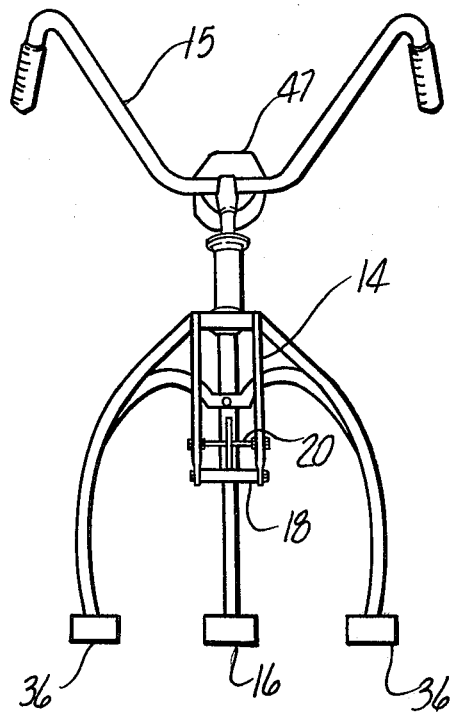
FIG. 4 is a front elevational view of a bicycle having the apparatus of my invention mounted thereon, with the front and rear wheels removed.
Figure 5:
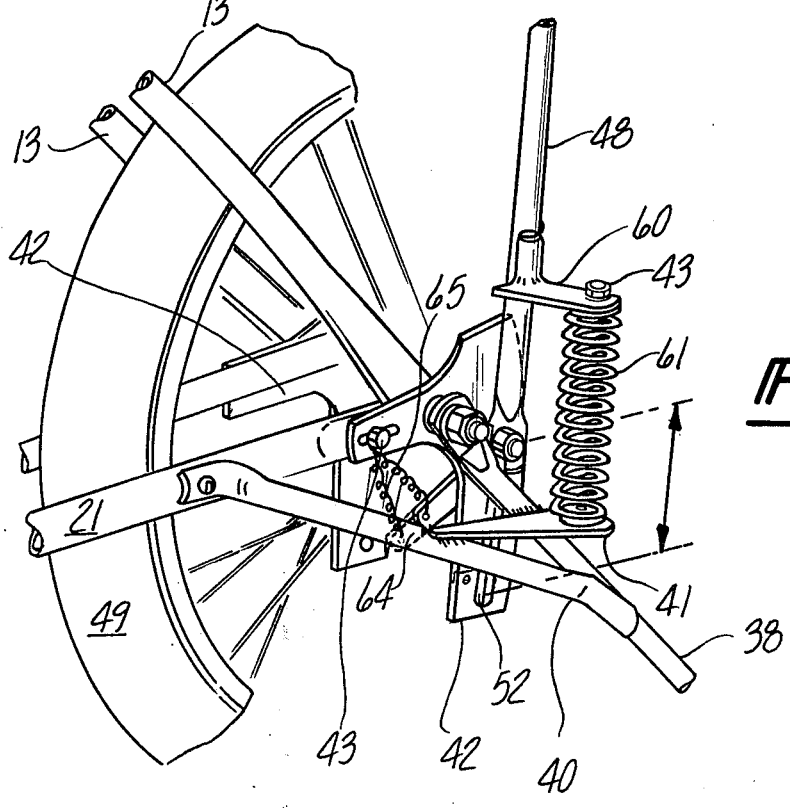
FIG. 5 is a partial perspective view of an apparatus embodying my improved rear wheel apparatus for conversion systems for pedal operated cycles.

Referring to FIGS. 1 and 2, there is shown a bicycle having my conversion mechanism mounted thereon, with said bicycle generally being designated by the numeral 11 and having a main frame 12 with an upper portion 22 and a lower portion 21, a rear fork 13 and a front fork 14, all forming a part of the bicycle 11.

The front fork 14 is mounted for rotation in a manner common in the art, which it is believed not necessary to describe herein. The fork is rotated by the handle bars 15. Mounted to the front fork 14 is a front ski mechanism 15 which may be the same as that shown in my aforementioned U.S. Pat. No. 3,884,484. The front ski mechanism 15 replaces the bicycle wheel normally used in summer and is mounted on an axle 18 in the same position in the front fork 14 of the bicycle as the axle of the wheel it replaced. The front ski mechanism consists essentially of a ski 16, mounted by suitable fastening means to the struts 17, which swivel about a front axle 18. A split loop bar 19 is mounted above the struts 17, and a pin 20 is mounted in any suitable manner between the sides of the front fork 14. It can be seen that as the front ski mechanism pivots about the axle 18 while traversing hilly terrain, the pin 20 will act to stop excessive swiveling by striking the sides of the split loop bar 19.

Also mounted to the main frame 11 of the bicycle is an emergency brake mechanism generally designated by the numeral 24. Such mechanism includes a support 25 fixedly mounted to the upper portion of the frame 22, and having a generally inclined guideway 25a therethrough to slideably accept a bar 26 for reciprocation therein. To help guide the bar 26, a second support 27 is provided on the lower portion of the frame 21 and has a second guideway 27a. A spring support 28 is mounted on the bar 26 in a predetermined position and a suitable spring 29 is fastened between the spring support 28 and the support member 25 to provide a spring action to the bar 26. A knob 30 completes the assembly, together with a fork 31.

To replace the rear wheel which is normally used, a combination unitized, pre-assembled rearward ski and rear wheel mechanism generally designated by the numeral 35 is provided. Such integral rear wheel and ski mechanism includes a pair of rear skis 36 mounted to forward braces 37 and rearward braces 38 by suitable fastening means such as the bolt and nut assemblies 39. Mounted to the braces 38 are a pair of forwardly extending supports 40 and to these, in turn, are mounted spring supports 41.

For mounting the rear wheel and ski assembly 35 there are provided a pair of brackets 42 which are mounted on each side of the rear fork 13 where the rear wheel would normally be mounted. Said brackets are held on by a pair of nut and bolt assemblies 43 and have an arcuate slot 53 therein having a center of curvature at the center of the pedal sprocket 59. The brackets are preferably made of a two-piece construction as shown in FIG. 10.

A seat adaptor generally designated by the numeral 44 is removably mounted in the frame in the manner in which the normal bicycle seat is mounted by virtue of the cylindrical portion 58 of the adaptor 44 being fastened in a hole in the frame and being held fast by the nut and collar assembly 57. The seat adaptor has a guideway 45 in which the front seat support 46 can reciprocate allowing for up-and-down motion of the seat 47. The rear seat support 48 is no longer in its old location on the bicycle axle, but is mounted to the axle 51 in its new location in the brackets 42. An elongated mounting post 83, having suitable holes 84 in alignment with the adjustment means 85 may be provided for adjusting the seat up and down as desired.

Figure 6:
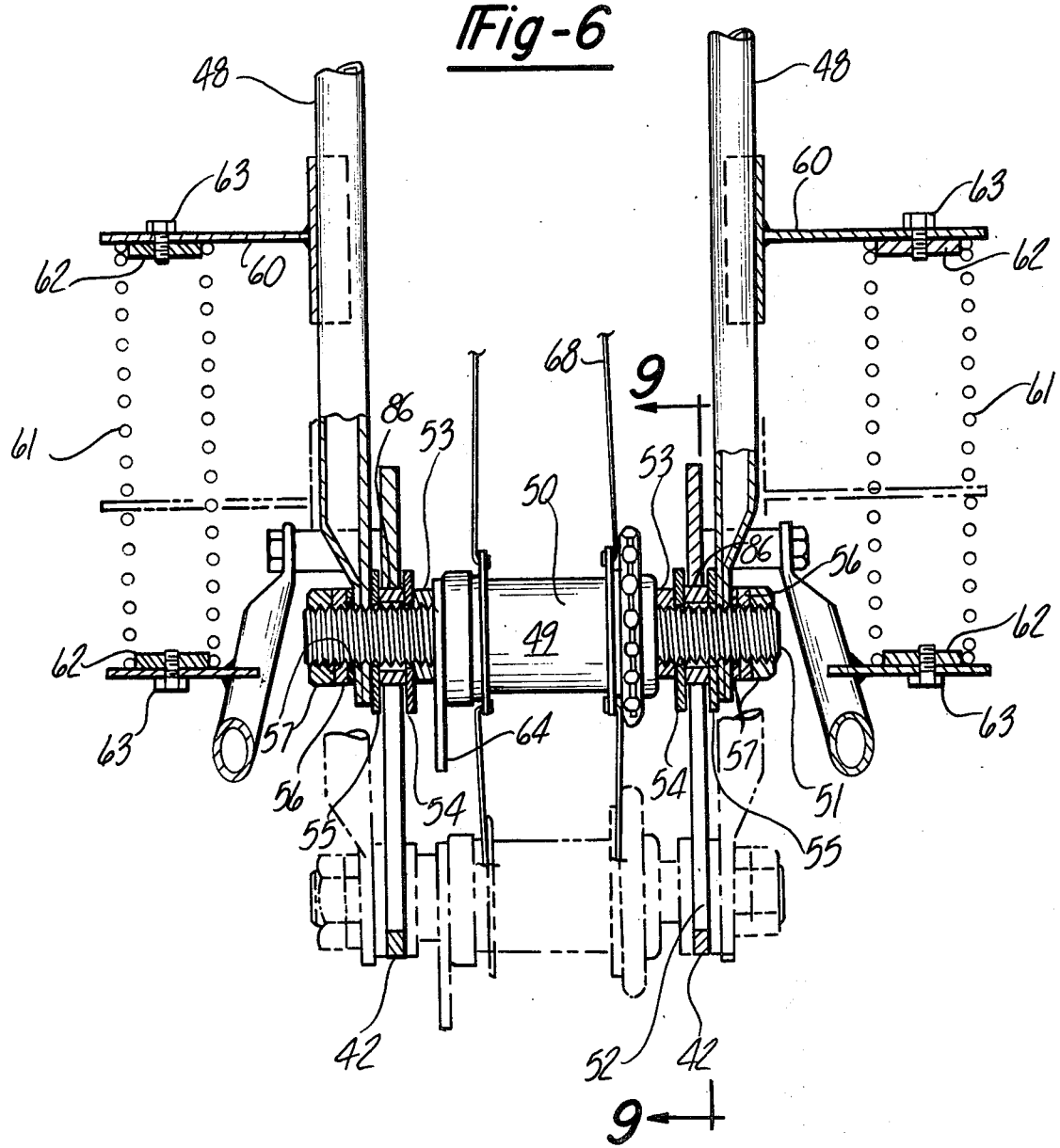
FIG. 6 is a partial sectional view taken in the direction of the arrows along the section line 6—6 of FIG. 2 and showing the rear wheel apparatus both in its normal, and partially extended, positions.

Referring now to FIG. 6, there is shown the rear bicycle wheel 49 having a hub 50, an axle 51, spokes 66 and a rear sprocket 67. A chain 69 drivingly connects the rear sprocket 67 and the pedal sprocket 59, with the operator or other motive power supplying the means to drive said pedal sprocket. Over both ends of the axle 51 there is placed a spacer 53, which may be of any suitable material, and the axle ends with the spacers 53 thereon next has mounted thereon a washer 54.

The assembly consisting of the hub 49 and axle 51, followed by the spacers 53 and plain washer 54 is carefully fitted in the hexagonal washers 86, which are, in turn, fitted in the slots 52 in the brackets 42 to aid in reciprocation of the rear wheel assemblies. To hold the axle stationary, and at the same time to provide for its reciprocation, second plain washers 55 are placed over each end of the axle 51 adjacent the brackets 42, and the seat supports 58, which were normally mounted to the rear axle 51 when it was in its summer use position, are now positioned over the ends of said axle, and a nut 57 is placed thereon next to such support.

Star washers 56 and second nuts 57 are placed on the assembly and tightened. By virtue of the spacing action provided by the spacers 53 and the hexagonal washers 86 the axle 51 will be held stationary but at the same time will be free to reciprocate in the slots 52.

Since the seat is free to reciprocate in the guideway 45, the rider, mounted on the seat 47, will apply a force substantially directly in a downward direction passing through the axis of rotation of the wheel 49, thereby providing the maximum possible traction. It can be seen at this point that in the absence of any dampening force, while the wheel 49 would have the necessary force applied and would revolve about the stationary axle 51, which would, in turn, reciprocate by virtue of its passing through the hexagonal washers 86 mounted in the slot 52 this would be an undesirable situation as uneven terrain would cause the frame and skis to bounce excessively. Thus the provision of the particular method of providing for reciprocation of the wheel assembly only partly solves the problem long standing in the art and a way still had to be found to maintain the skis in contact with the terrain at all times. To solve this problem, I provide upper spring supports 60 on either side of the rear seat supports 48.

These supports may be mounted thereon by any suitable means a predetermined distance from the bottom thereof. Suitable spring means such as the coil springs 61 or the like are interposed between the upper spring supports 60 and the lower spring supports 41. The springs may be held in place by suitable restraining means 62 and these, in turn, are fastened to the upper and lower spring support bracket by any suitable fastening means, such as the bolt 63.

To maintain the braking power of the bike, the normal braking assembly which was present on the summer use cycle is retained in the rear wheel assembly 35 and the brake arm 64 is spring mounted by way of the restraining springs 65 to the main frame (lower portion) 21 so that it can travel in an up-and-down fashion.

Figure 11:
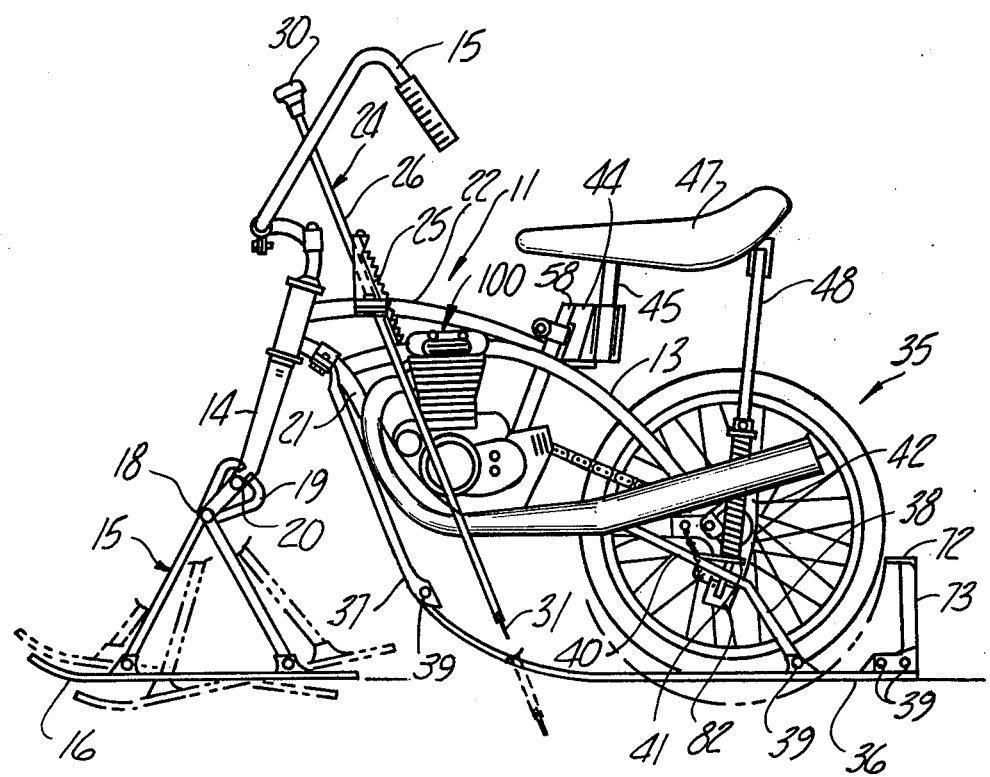
FIG. 11 shows a side elevational view of a bicycle with my invention mounted thereon and powered by an internal combustion engine.

There has been shown thus far a portion of a conversion system for pedal operated cycles in the form which may be used to traverse snowy terrain. As it has been found that the drag of the cycle over snow is greater than that which can be overcome by the ordinary rider due to the increased weight placed on the ski mechanism, it is preferable that the embodiment of my invention used for snow be motorized as shown in FIG. 11. It should be understood, therefore, that it is well within the scope of the claims of the present invention that the pedal sprocket 59 may be mounted to the output shaft of a gasoline engine or the like and suitable controls be provided to operate the engine so that it may provide the motive power necessary. Such means of mounting the necessary motive power are well known in the art and thus they are not shown, and it is felt that they need not be described in detail herein.

In contrast to the desirability of having an engine mounted on the cycle for use over snowy terrain, it has been found perfectly acceptable to maintain the conversion system for the pedal operated cycle in a nonmotorized form for use on ice by adults and/or children. Some additional considerations are needed however when traversing ice and the first of these is the fact that the large ski area provided for traversing snow so that the cycle will not sink therein is not needed when traversing ice, and a very small area of the ski only needs to contact the ice to support the cycle and give directional stability thereto.

In my experience it has also been found desirable to provide additional traction to the rear wheels when converting the cycle for use over ice. It is obvious that the traction provided by the rear wheel 49 is substantially less on ice than on snow and unless a way is found to improve the traction of said rear wheel, forward motion may be lost.

One obvious way to increase the traction of the wheel 49 is to provide studs therein, and this method is entirely within the scope of the claims of the present invention.

To complete the invention there may be mounted, if desired, a platform 72 for use by the rider in mounting the cycle with such platform being mounted on a support member 73 which, in turn, is attached between both rear ski assemblies by additional fastening means 39.

If a detachable runner is desired for use on ice, the one shown in FIGS. 8 and 9 may be used. The runner 79 is center mounted by virtue of having several angle irons 78 attached by any suitable means such as welding or the like at various points along its length. The angle irons 78 are then provided with holes 80 which are adapted to mate with corresponding holes in the skis 36. Nut and bolt assemblies 43 are then passed through the angle irons 78 and the skis 36 to fixedly, but removably, attach the runner 79 thereto.

Thus, the wheel 49 is provided with means not only for rotation but also for substantially vertical reciprocation to traverse hilly terrain under icy and snowy conditions. By solving the problems remaining after my prior invention, I have provided an improved conversion system for pedal operated cycles having a substantially improved rear wheel apparatus and other novel features.

I claim:

1. An improvement in a conversion system for pedal operated cycles of the type having a frame having an upper and a lower portion, a front fork, a wheel mounted for suitable rotation therein, and a rear fork, a rear wheel suitably mounted in said rear fork, and means for causing rotation of said rear wheel, said improvements including a front ski mechanism, means for mounting said front ski mechanism in said front fork in place of said front wheel to provide a rocking motion thereof, means for restraining said rocking motion, means to provide for reciprocative mounting of the normal seat of said bicycle on said upper portion of said frame, a combination unitized rearward ski and rear wheel mechanism, means for mounting said combination rear wheel and rear ski mechanism in place of said rear wheel, means interposed between said rear seat and said rearward ski and wheel mechanism to provide for reciprocation of said rear wheel mechanism in unison with said seat, braking means mounted to said rear wheel and said frame, a support platform to facilitate mounting of said cycle and to provide support for a pair of skis forming a portion of said rearward ski and wheel mechanism, and means to mount said platform to said rearward ski mechanism.

2. The device defined in claim 1, wherein said means for causing rotation of said rear wheel include a pedal sprocket rotatably mounted to said frame, means to cause rotation of said pedal sprocket, a rear sprocket adapted to reciprocate in a pair of brackets having an arcuate slot, and a suitable chain connecting said pedal sprocket and said rear sprocket.

3. The device defined in claim 1, and including an emergency brake mechanism consisting essentially of a support member removably but fixedly mounted to said upper portion of said frame and having a guideway therein, a pusher bar slideably mounted in said guideway, a second support member suitably mounted to said lower portion of said frame and also having a guideway therein, with said pusher bar passing through said guideways and said first and said second support members, a spring support mounted to said pusher bar in a predetermined location, a spring retaining means provided in said first support member, a spring having two ends and having one end attached to said first support member and the other end attached to said spring support member, a handle provided on the upper end of said pusher bar and a fork provided on the lower end of said pusher bar.

4. The device defined in claim 2, wherein said means to provide for reciprocative mounting of the normal seat of said bicycle include a seat adaptor having a cylindrical portion formed integrally therewith, and a guideway formed therein, said cylindrical portion mounted to said frame in place of the normal bicycle seat, a front seat support for said seat being mounted in said guideway, and a rear seat support attached to the rear of said seat and forming a portion of said means interposed between said rear seat and said rearward ski and wheel mechanism.

5. The device defined in claim 4, wherein said rear seat support includes a seat adjustment means and a seat mounting post adapted to be mounted to said seat and be slideably adjustable within said adjustment means.

6. The device defined in claim 4, wherein said combination rearward ski and rear wheel mechanism includes a pair of rear skis, one on each side of said rear wheel, having a plurality of upstanding projections depending there on, a pair of forward braces mounted one each to the forward end of each of said rear skis, a pair of rear braces also mounted one each to each of said skis, both of said pairs of braces being mounted to said projections by suitable fastening means, a forwardly extending support fastened to each of said rear braces, and a spring support mounted to each of said forwardly extending supports, said forwardly extending supports being fastened to the lower portion of said frame by said means for mounting said combination rearward ski and wheel mechanism, and a pair of brackets having an arcuate slot with the center of curvature at said pedal sprocket and being mounted at the extremity of said lower portion of said frame in place of said normal summer bicycle wheel.

7. The device defined in claim 6, wherein said interposed means includes a pair of downwardly extending seat supports mounted at one end to said rear seat support and at the lower end to said rear wheel, a pair of spacers mounted over each end of the axle of said wheel, a pair of plain washers next mounted over each end of said axle, a hexagonal washer placed in each of said slots, said axle being passed through each of said hexagonal washers, a pair of second plain washers placed over said axle on each side of said wheel, with said seat support being placed over said second plain washers, a first nut adjacent said seat supports, a star washer and a second nut tightened onto each end of said axle to hold said seat supports in place, thereby providing for the reciprocating motion of the rear seat in unison with the rear wheel.

8. The device defined in claim 7, wherein said means interposed between said rear seat and said rear wheel and rearward ski mechanism include upper spring brackets mounted on said downwardly extending seat supports, coil springs, with said coil springs having spring retainers mounted at each end thereof, said retainers being mounted to said upper and said lower spring supports by suitable fastening means.

9. The device defined in claim 8, wherein said braking means include the normal coaster braking assembly found in said summer use cycle, and further including spring means interposed between the end of the brake arm found on said brake mechanism and said lower portion of said main frame.

10. The device defined in claim 9, wherein said means for rotating said rear wheel include an internal combustion engine adapted to rotate said pedal sprocket.

11. The device defined in claim 10, wherein said rear skis include a pair of runners suitably mounted thereto along a longitudinal axis in a downwardly extending direction, and said front ski includes a runner removably but fixedly mounted thereto.

12. The device defined in claim 11, wherein said runners are centrally located with respect to said front and rear skis.

13. The device defined in claim 12, wherein said brackets having said arcuate slot include a removable lower portion and an upper portion with said lower portion fixedly but removably attached to said upper portion.

* * * * *